US012621298B2

(12) United States Patent
Sivaram et al.

(10) Patent No.: US 12,621,298 B2
(45) Date of Patent: May 5, 2026

(54) SECURE HYBRID DATA TRANSFER THROUGH CONNECTION AND REQUEST DIRECTION DECOUPLING

(71) Applicant: Confluent, Inc., Mountain View, CA (US)

(72) Inventors: Rajini Sivaram, Romsey (GB); Nikhil Bhatia, Bellevue, WA (US)

(73) Assignee: Confluent, Inc., Mountain View, CA (US)

( * ) Notice: Subject to any disclaimer, the term of this patent is extended or adjusted under 35 U.S.C. 154(b) by 227 days.

(21) Appl. No.: 18/052,130

(22) Filed: Nov. 2, 2022

(65) Prior Publication Data

US 2024/0146731 A1     May 2, 2024

(51) Int. Cl.
*H04L 9/40* (2022.01)
*H04L 67/141* (2022.01)

(52) U.S. Cl.
CPC ........ *H04L 63/0884* (2013.01); *H04L 67/141* (2013.01)

(58) Field of Classification Search
CPC .......................... H04L 63/0884; H04L 67/141
See application file for complete search history.

(56) References Cited

U.S. PATENT DOCUMENTS

| | | | | |
|---|---|---|---|---|
| 2004/0143665 | A1* | 7/2004 | Mace | H04L 67/142 |
| | | | | 709/227 |
| 2019/0340091 | A1* | 11/2019 | Chandrasekaran | H04L 63/08 |
| 2020/0267201 | A1* | 8/2020 | Rauschenbach | G06F 9/542 |
| 2021/0034767 | A1* | 2/2021 | Free | G06F 21/6218 |
| 2022/0329583 | A1* | 10/2022 | Shilimkar | H04L 63/20 |

* cited by examiner

*Primary Examiner* — Amir Mehrmanesh
*Assistant Examiner* — Forrest L Carey
(74) *Attorney, Agent, or Firm* — Schwegman Lundberg & Woessner, P.A.

(57)     ABSTRACT

Systems and methods are directed to secure hybrid data transfer through connection and request direction decoupling. Initially, a controller server in a source on-premises cluster establishes a persistent connection to a controller server in a destination cloud cluster. The connection is then reversed, which enables destination servers to request additional connections between any pair of source and destination servers dynamically from the source cluster. Each of these connections is established by a source server, which authenticates to a cloud (destination) server and then requests to reverse the connection. The reversed connections can be used to transfer data securely between the on-premises and cloud servers. The source server can be a broker in a source cluster located on-premises and the destination server can be a broker in a destination cluster in the cloud.

20 Claims, 6 Drawing Sheets

SECURE HYBRID DATA TRANSFER THROUGH CONNECTION AND REQUEST DIRECTION DECOUPLING

TECHNICAL FIELD

The subject matter disclosed herein generally relates to data migration. Specifically, the present disclosure addresses systems and methods for secure hybrid data transfer through connection and request direction decoupling and reversal.

BACKGROUND

Organizations usually have clusters running both in the cloud and on-premises. These days, users want the ability to access data from both locations. As such, data needs to be moved from on-premises to the cloud. In order to flow data from on-premises clusters to clusters in the cloud, applications or brokers running in the cloud need to be able to fetch data from the on-premises clusters. This requires applications running in the cloud to establish connections to the on-premises clusters, which are typically behind a firewall that prevent any arbitrary application from connecting to internal systems. Many organizations also use corporate authentication servers (e.g., Active Directory or OAuth servers) to authenticate connections for their on-premises servers. These on-premises servers need to be accessible to the cloud for applications from the cloud to authenticate to the on-premises servers. However, security conscious organizations are very unlikely to grant network access or access to corporate authentication servers from the cloud. This makes it difficult when data needs to be migrated from the on-premises to the cloud or made available in both the on-premises and the cloud (e.g., to set up a disaster recovery cluster).

In some existing systems, a third cluster in the middle reaches out to both the on-premises and the cloud cluster to consume from on-premises and then produce to the cloud. However, this process poses operational challenges and extra maintenance overhead for the third cluster, which cannot be moved to a managed cloud cluster due to the connection direction limitation. Another option is to use proxies, which also come with significant operational burden.

BRIEF DESCRIPTION OF THE DRAWINGS

Some embodiments are illustrated by way of example and not limitation in the figures of the accompanying drawings.

DETAILED DESCRIPTION

Figure 1:
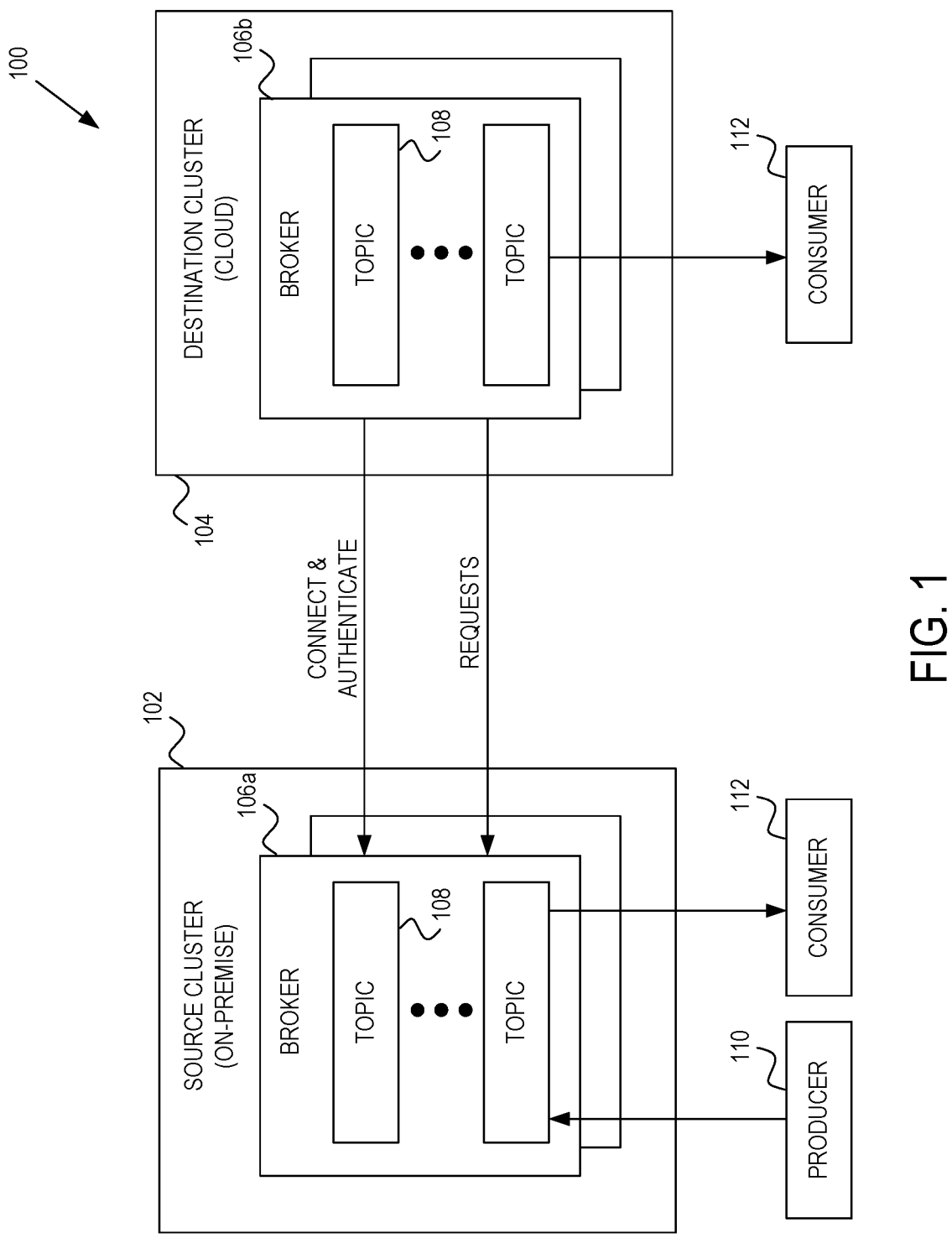
FIG. 1 is a diagram illustrating a high-level distributed streaming architecture for transferring data from an on-premises source to the cloud, according to some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

In order to flow data from an on-premises cluster to the cloud, applications or brokers running in the cloud need to establish a connection to the on-premises cluster to be able to fetch the data from the on-premises cluster. The cloud comprises a network of servers that are accessible over the Internet, and the software and databases that run on those servers. Because most organizations do not want to open up their on-premises clusters to enable clients from the cloud to establish connections, example embodiments allow a source (e.g., source cluster or broker) that is on-premises to establish a connection with the cloud (e.g., cloud cluster or broker) and initiate reversal of the connection (e.g., changing a direction of request flow on the connection). Once the connection is reversed, a client on the cloud broker can send requests to the on-premises broker. This is in contrast to conventional systems whereby the entity establishing the connection is the one sending the requests.

There are several advantages to reversing a connection established by the on-premises source. First, the need for the cloud broker to connect to the on-premises cluster is removed. Additionally, any security protocol for on-premises clusters can be supported since all connections between the cloud and on-premises will be authenticated by the cloud using the authentication mechanisms supported on the cloud. These advantages will become apparent in the detailed description below.

Thus, example embodiments address the technical problem of how to efficiently migrate data from a source cluster located on-premises to a destination cluster in the cloud (also referred to as "cloud cluster"). To address the technical problem, example embodiments utilize source-initiated connections that are reversed after authentication has been performed to enable requests to flow in the opposite direction. As a result, example embodiments provide a technical solution that, among other things, reduces the operational burden of having to run a third cluster that can talk to both the on-premises source cluster and the cloud cluster by allowing the cloud to talk to the on-premises cluster. This is done without the cloud cluster directly connecting with the on-premises cluster, which most organizations will not allow for security reasons.

FIG. 1 is a diagram illustrating a high-level distributed streaming architecture 100 for transferring data from an on-premises source to a cloud destination, in accordance with example embodiments. The distributed streaming architecture 100 provides a distributed streaming platform used to stream processes, applications, and data. In one embodiment, the distributed streaming platform is Apache Kafka®.

In example embodiments, the distributed streaming platform comprises a source cluster 102 that is on-premises in communication with a destination cluster 104 that is in the cloud. The source cluster 102 and the destination cluster 104 are communicatively coupled via one or more networks (not shown). The networks can include, for example, a wide area network (WAN), the Internet, or another packet-switched data network.

In example embodiments, the source cluster 102 and the destination cluster 104 both comprise one or more brokers 106a and 106b (collectively, brokers 106). In some cases, the brokers 106 are a network of machines (e.g., servers). In other cases, the brokers 106 are containers running on virtualized servers on processors in a datacenter, or a combination of the machines and containers.

The brokers 106 are configured to run a broker process in order to handle requests from clients and keep data replicated. Specifically, each broker 106 can host a plurality of partitions associated with topics 108, handle incoming requests to write new events (e.g., a fact that happened) to those partitions, read events from the partitions, and/or handle replication of partitions. Each topic is a unit of organization that groups similar records/data together (e.g., by category). Thus, each topic 108 acts as container to hold similar events. The partition is the smallest storage unit holding a subset of records or data for a particular topic 108.

Each broker 106 has a network server that accepts connections on one or more listeners and allocates each connection to a processor from its pool of processors. A selector associated with the assigned processor handles all traffic on the connection using non-blocking input/output. The state of each connection is stored in a channel managed by the selector.

Clients (e.g., producer 110, consumer 112) connect to the brokers 106 on one of the advertised listeners. The clients are configured with security configurations to authenticate with the broker 106 for the security protocol used by the listener. A network client used by the client has its own selector that establishes connections and processes traffic to/from the brokers 106. A state of each connection is stored in a channel managed by the selector of the network client.

For a typical flow (e.g., to obtain metadata), the client establishes a connection to the broker 106 and initiates authentication flow. If authentication fails, the connection is terminated by the broker 106. Otherwise, the channel moves to a ready state and the broker 106 starts processing requests arriving on the channel. On each channel, the client sends requests and the broker 106 processes a request, sends a response to the request, and then reads the next request.

A producer 110 is configured to produce new data and send the new data (e.g., new records) to the broker 106a in the source cluster 102. In some embodiments, the producer 110 comprises a client application that is a source (e.g., publishes, streams) of the events. In some embodiments, the producer 110 streams or publishes the new data to the broker 106a in real-time.

A consumer 112 is configured to consume data (e.g., batches of records) from one or more topics 108 of the broker 106. More particularly, the consumer 112 is an end-user or application that retrieves data from the source cluster 102 or the destination cluster 104. In some embodiments, the consumer 112 subscribes to respective topics 108 in order to read and process data from the respective topics 108.

Thus, the source cluster 102 receives the new data from the producer 110 and stores the new data into respective topics 108. Because of the desire to have data accessible from both the source cluster 102 and the destination cluster 104, the new data needs to be transferred (e.g., copied) from the source cluster 102 to the destination cluster 104 in the cloud. Ideally, this is done by the destination cluster 104 reaching out to the source cluster 102 and pulling the data. However, most organizations typically have security protocols in place that prevent applications or the brokers 106b running in the cloud (e.g., the destination cluster 104) to connect to their internal systems (e.g., the source cluster 102). In the embodiment of FIG. 1, a connection, authentication, and requests associated with data all flow in one direction—from the destination cloud system (e.g., the cloud broker 106b) to the source on-premises system (e.g., the on-premises broker 106a).

Figure 2:
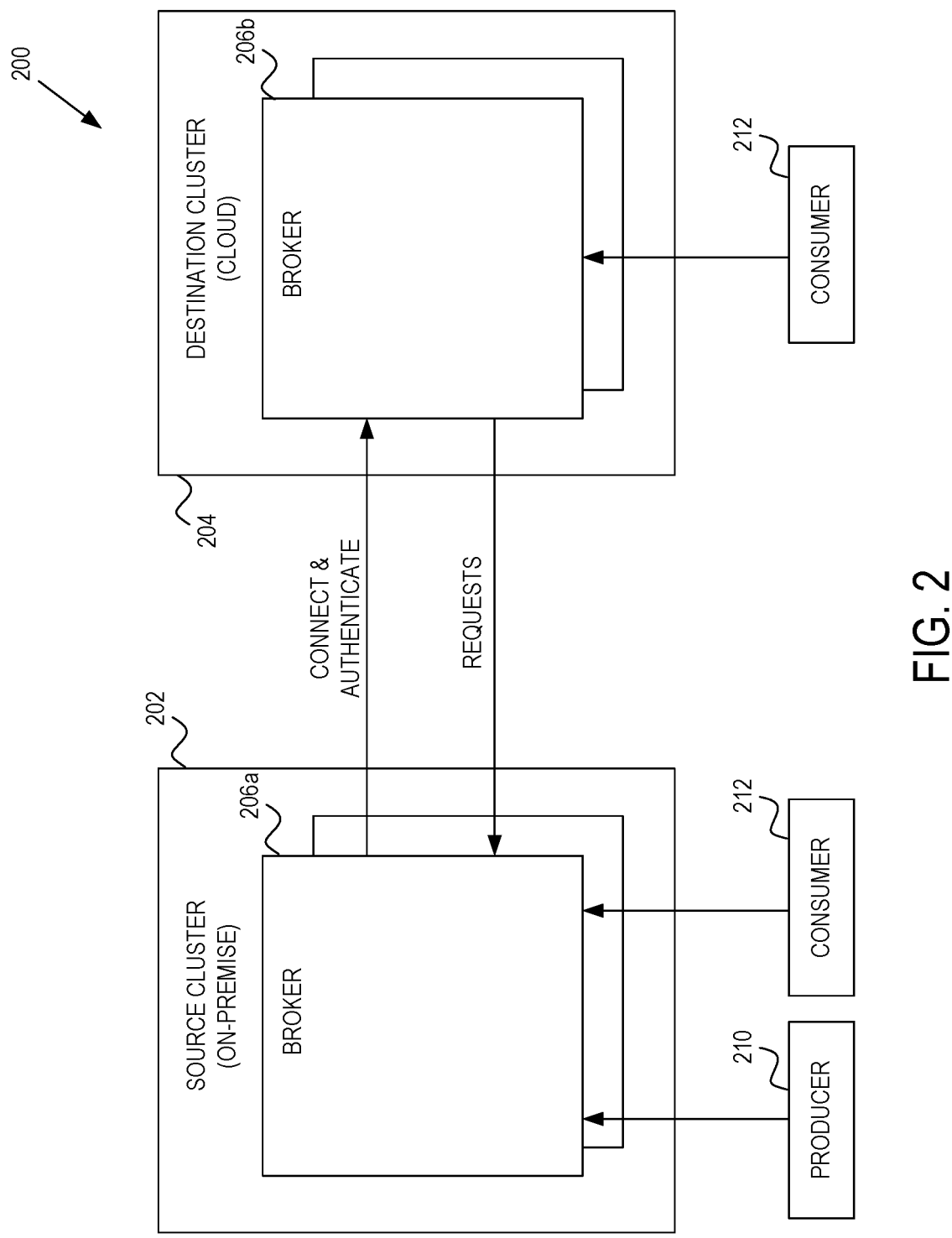
FIG. 2 is a diagram illustrating a high-level distributed streaming architecture that decouples a connection from a request, according to some example embodiments.

Referring now to FIG. 2, a high-level distributed streaming architecture 200 that decouples the connection from the request, in accordance with example embodiments, is shown. FIG. 2 provides an extension to the embodiment of FIG. 1 by extending an application wire protocol (e.g., a binary protocol) to allow for reversing a connection established by an on-premises source cluster 202. In one embodiment, the distributed streaming platform is Apache Kafka.

Similar to the architecture 100 of FIG. 1, the distributed streaming platform comprises a source cluster 202 that is on-premises in communication with a destination cluster 204 that is in the cloud. The source cluster 202 and the destination cluster 204 are communicatively coupled via one or more networks (not shown). In example embodiments, the source cluster 202 and the destination cluster 204 both comprise one or more brokers 206a and 206b (e.g., Kafka brokers). The brokers 206 are similar to the brokers 106 of FIG. 1 and perform similar operations. Additionally, a producer 210 is configured to produce new data and send the new data (e.g., new records) to the broker 206a in the source cluster 202 and a consumer 212 is configured to consume data (e.g., batches of records) from the broker 206a in the source cluster 202 or from the broker 206b in the destination cluster 204.

However, unlike the embodiment of FIG. 1, the direction of the request is decoupled from the direction of the initial connection in the embodiment of FIG. 2. Here, the on-premises broker 206a initiates the connection and performs authentication. Once the connection is established, the extended protocol (e.g., extension of the Apache Kafka protocol) allows the connection to be reversed. As a result, the destination broker 206b can now send requests to the source broker 206a. The connection, authentication, and reversal processes will be discussed in more detail below.

In example embodiments, any of the components shown in, or associated with, FIG. 2 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system, device, or machine. For example, a special-purpose computer system able to implement any one or more of the methodologies described herein is discussed below with respect to FIG. 6, and such a special-purpose computer is a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any of the components illustrated in FIG. 2 or their functions may be combined, or the functions described herein for any single component may be subdivided among multiple components. Additionally, any number of brokers 206 may be embodied within the source cluster 202 or the destination cluster 204. While only a single source cluster 202 and a single destination cluster 204 is shown, alternative embodiments contemplate having multiple source clusters 202 on-premises and multiple destination clusters 204 in the cloud.

In some alternative embodiments, both the source cluster 202 and the destination cluster 204 may be on cloud, both the source cluster 202 and the destination cluster 204 may be on-premises, or the source cluster 204 may be on the cloud and the destination cluster 204 may be on-premises. These combinations are useful in scenarios where data is produced to both the source cluster 202 and the destination cluster 204 and data is mirrored in both directions between the clusters 202 and 204. In these cases, data may be transferred in one direction using standard request flow and in the other direction using reverse request flow using a single configuration with connections always established in one direction, but data flowing in either direction.

Figure 3:
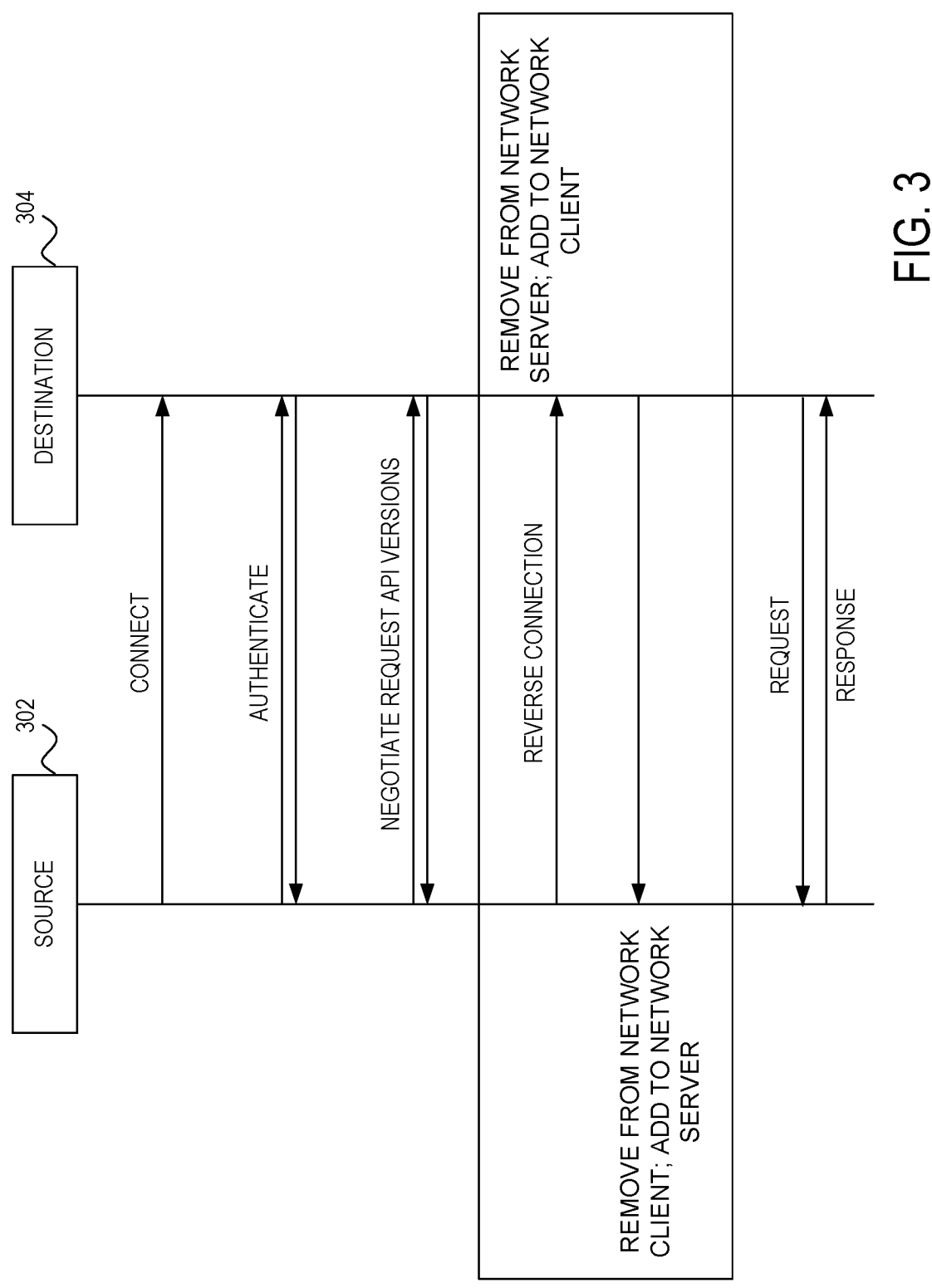
FIG. 3 is a diagram illustrating a reverse connection process flow, according to some example embodiments.

FIG. 3 is a diagram illustrating a reverse connection process flow, according to some example embodiments. To enable connections for data transfer to originate from a source 302, reversible connections that are established by a source broker are used. Initially, a source broker at the source 302 establishes a client connection (CONNECT) to a destination broker at a destination 304.

The source broker then authenticates with the destination broker (AUTHENTICATE). In one embodiment, a simple authentication and security layer (SASL) is used for authentication. The SASL mechanism can be, for example, PLAIN (e.g., simple username/password authentication mechanism), Salted Challenge Response Authentication Mechanism (SCRAM), Open Authentication (OAuth), Generic Security Service Application Program Interface (GSSAPI), or a custom implementation.

After authentication, the source broker negotiates request versions for the application programming interface (API) versions supported by the destination broker, so that subsequent requests can be generated with request versions known to both sides (NEGOTIATE REQUEST API VERSION).

The source broker can then send a connection reversal request (REVERSE CONNECTION) with a version supported by the destination. When the destination broker receives this request, it sends a response to the connection reversal request to the source broker. Then the destination broker removes the server-side channel on which the request was received from its network server and adds it as a client-side channel to a network client. When the source broker receives the destination response, the source broker removes its client-side channel that was used to send the request from its network client and adds it as a server-side channel to its network server. The result is a reverse connection where the destination 304 can send requests to the source 302 on a connection that was established by the source 302.

For example, cluster linking allows one cluster (e.g., a destination cluster) to mirror data directly from another cluster. Thus, a cluster link can be established between a source cluster and a destination cluster. For cluster links configured with the connection originating from the source cluster, a source controller (e.g., source controller 402 of FIG. 4) can create and maintain a persistent reverse connection from the source controller to a destination controller. The source and destination controllers can be elected dynamically and discovered by the brokers in the source and destination clusters using known election and discovery techniques. For example, a distributed coordination service such as Apache ZooKeeper™ may be used for election and discovery of controllers. Requests for more connections can be sent by the destination 304 to the source 302 over this connection between the source controller and the destination controller. Since all source brokers are connected to each other and destination brokers are connected to each other, the persistent connection between the source and destination controller provides full connectivity to forward requests across the two clusters. Thus, in one embodiment, all requests for new connections will be sent by the source controller to the source broker which establishes the connection to the destination.

In a further embodiment, other existing connection can be used to optimize the process. For example, a connection between the source broker and the destination broker can be used to request new connections. Additionally, connection multiplexing may be used to reduce a number of connections required between two clusters for cluster linking.

In example embodiments, the process of reversing connections is secured using a combination of authentication of the local connection on which the request to initiate the request is received, authorization of this request by the source server, authentication of the connection from the source to the destination by the destination server and authorization of the request to reverse the connection by the destination server. This process also establishes a source-side secure identity for the reverse connection that does not require destination brokers to have access to source authentication servers.

Figure 4:
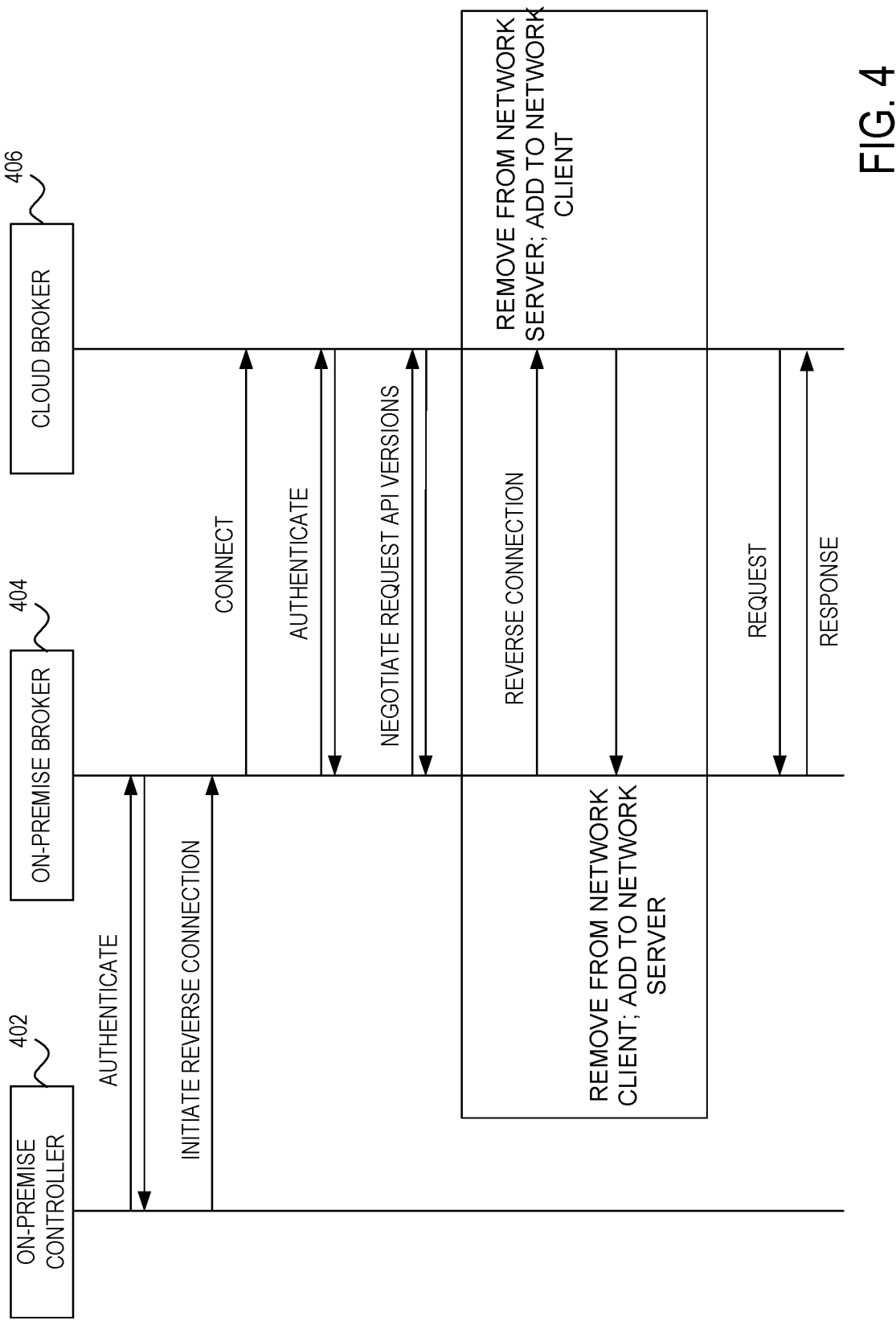
FIG. 4 is a diagram illustrating a detailed reverse connection process flow, according to some example embodiments.

FIG. 4 is a diagram illustrating a detailed reverse connection process flow, according to some example embodiments. In example embodiments, an on-premises controller 402 is configured to connect to an on-premises broker 404. In some embodiments, the connection may be triggered by a request from a user to establish a reverse connection with a destination in the cloud. When a connection is established, the on-premises controller 402 authenticates with the on-premises broker 404 using a supported authentication mechanism on the on-premises listener (AUTHENTICATE). For example, authentication can utilize a secure socket layer (SSL) or Simple Authentication and Security Layer/Generic Security Services Application Program Interface (SASL/GSSAPI). Since this authentication is within the on-premises cluster, any authentication mechanism supported by the on-premises cluster may be used, without granting access to on-premises authentication servers from the cloud. The authenticated on-premises identity (also referred to as "source service identity") established during this process by the on-premises broker 404 is associated later with the reverse connection.

In order to initiate a reverse connection to a cloud broker 406, the on-premises controller 402 requests a reverse connection from the on-premises broker 404 on the authenticated connection (INITIATE REVERSE CONNECTION). This request contains details of the connection that is required including the identifiers of the source and destination broker pair between which the connection is required. The request also includes a request identifier that enables the reverse connection to be allocated to a destination client that needs this connection to transfer data. In response, the on-premises broker 404 establishes a connection with a destination cloud broker 406 (CONNECT).

The on-premises broker 404 then uses a security mechanism to authenticate itself (AUTHENTICATE) with the cloud broker 406. In some embodiments, username and password valid for a specific cluster may be used, in accordance with some embodiments.

API request versions can then be negotiated between the on-premises broker 404 and the cloud broker 406 to determine the request versions to use for subsequent requests (NEGOTIATE REQUEST API VERSIONS).

Once the connection is established and authenticated and the API versions are negotiated, a reverse connection request is transmitted by on-premises broker 404 to the cloud broker 406 (REVERSE CONNECTION). This request contains the request identifier from the INITIATE REVERSE CONNECTION request that triggered this connection. After the connection is reversed, it is allocated to the destination client corresponding to this request identifier. The request also includes details of the source broker (e.g., the on-premises broker 404) to which the reverse connection will be added. The destination broker (e.g., the cloud broker 406) verifies that this metadata matches the expected source broker from which the client expects to transfer data. It also authorizes the request based on the authenticated destination service identity associated with the connection of this request before proceeding with connection reversal.

If authorization succeeds, the cloud (destination) broker 406 first sends a response for the reverse connection request to the on-premises broker 404 and then removes the server-side connection from its network server and adds an equivalent client-side connection to the network client associated with the request identifier. Once the on-premises broker 404 receives the response, it removes its client-side connection from the network client and adds an equivalent server-side connection to its network server. The authenticated source service identity associated with the INITIATE REVERSE CONNECTION request from the on-premises broker 404 is now associated with the new server-side connection, enabling subsequent requests to be authorized based on this identity. Thus, what was a server-side connection becomes a client-side connection and what was the client-side connection becomes the server-side connection. Once a connection initiated by the source is reversed, it looks exactly like a connection that was initiated by the destination. With the connection reversed, the cloud broker 406 can access the data from the on-premises broker 404 by sending a request (e.g., REQUEST) and receiving the data in response (RESPONSE).

Figure 5:
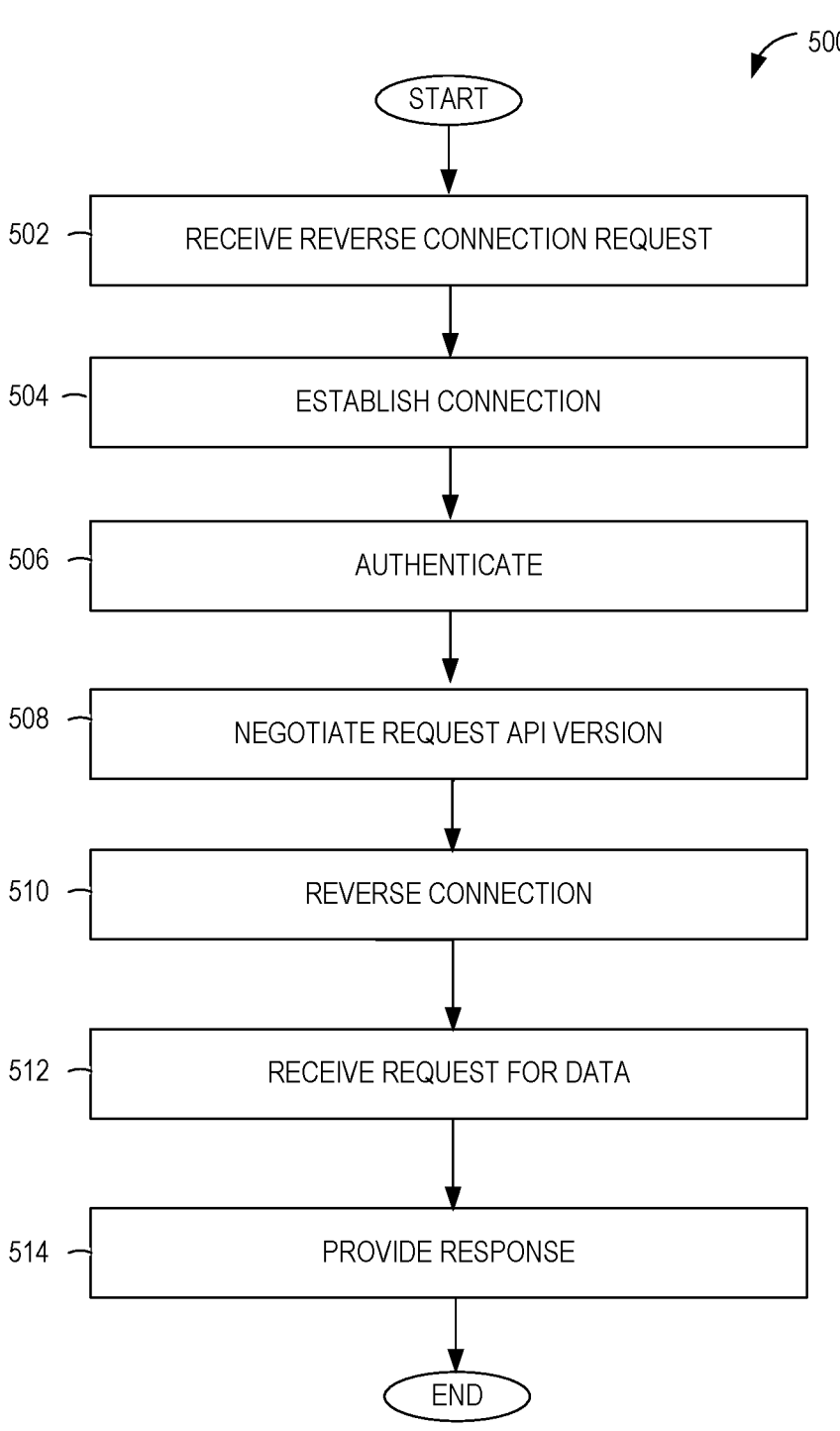
FIG. 5 is a flowchart illustrating operations of a method for secure data transfer through connect and request direction decoupling, according to some example embodiments.

FIG. 5 is a flowchart illustrating operations of a method 500 for secure data transfer through connect and request direction decoupling, according to some example embodiments. Operations in the method 500 may be performed by the components in the network environment described above with respect to FIG. 1, FIG. 2, and FIG. 4. Accordingly, the method 500 is described by way of example with reference to components in the source and the cloud. However, it shall be appreciated that at least some of the operations of the method 500 may be deployed on various other hardware configurations or be performed by similar components. Therefore, the method 500 is not intended to be limited to these components.

In operation 502, an on-premises broker at a source receives a request to initiate a reverse connection. In example embodiments, the trigger (or instruction) is received from an on-premises controller that has connected to and authenticated with the on-premises broker.

In operation 504, the on-premises broker establishes a connection with a destination. In some cases, the connection may be established in response to the initiate reverse connection request. Specifically, the on-premises broker establishes a connection with a cloud or destination broker (e.g., cluster linking).

Once the connection is established, authentication is performed in operation 506. In some embodiments, username and password are used in the authentication process to control access to cloud components and resources. In some cases, these credentials may be valid for a specific cluster.

In operation 508, API request versions are negotiated to ensure that the versions of application requests including requests to reverse connections are sent with versions known to the cloud broker.

In operation 510, the connection is reversed. In example embodiments, a reverse connection request is transmitted by the on-premises broker to the cloud broker. In response to the reverse connection request, the cloud broker removes the connection from the network server and adds the connection to the network client, and the on-premises broker removes the connection from the network client and adds the connection to the network server.

With the connection reversed, the cloud broker can access the data from the on-premises broker. Thus, in operation 512, the on-premises broker receives a request from the cloud broker. In response, the on-premises broker provides a response in operation 514, which includes the data, to the destination broker.

Example embodiments are discussed above whereby a source (e.g., source cluster or source broker) on-premises establishes the initial connection with a destination (e.g., destination cluster or destination broker) in the cloud and requests reversal of the connection (e.g., changing the direction of request flow on the connection). In an alternative embodiment, the protocol can be changed to allow bi-directional requests after the source establishes the connection. Here, the source will initiate the connection with reverse direction as discussed above. However, the direction can be reversed again by the destination by having the destination perform the same operations as the source performed to initially reverse the connection. For example, the operations within the box shown in FIG. 4 can be repeated (in reverse) each time a connection needs to be reversed.

In another embodiment, the reverse connection request can be a part of an existing request that is being sent, whereby the request indicates that after this request, the connection will be reversed. Alternatively, the reverse connection request can be included (e.g., piggyback) on top of an existing request or on top of an existing response, to allow for bi-directional switching of connections.

Figure 6:
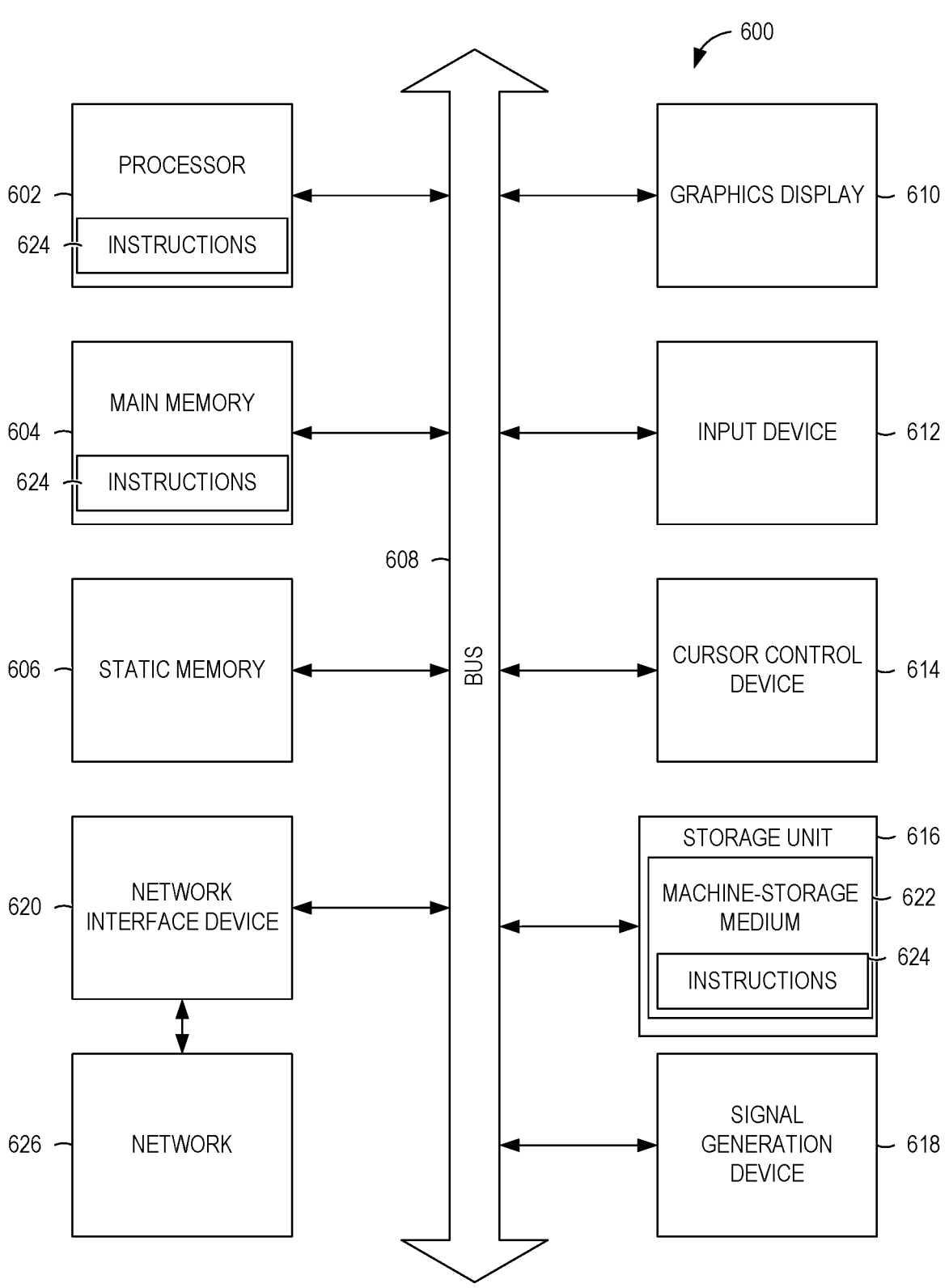
FIG. 6 is a block diagram illustrating components of a machine, according to some example embodiments, able to read instructions from a machine-storage medium and perform any one or more of the methodologies discussed herein.

FIG. 6 illustrates components of a machine 600, according to some example embodiments, that is able to read instructions from a machine-storage medium (e.g., a machine-storage device, a non-transitory machine-storage medium, a computer-storage medium, or any suitable combination thereof) and perform any one or more of the methodologies discussed herein. Specifically, FIG. 6 shows a diagrammatic representation of the machine 600 in the example form of a computer device (e.g., a computer) and within which instructions 624 (e.g., software, a program, an application, an applet, an app, or other executable code) for causing the machine 600 to perform any one or more of the methodologies discussed herein may be executed, in whole or in part.

For example, the instructions 624 may cause the machine 600 to execute the flow diagrams of FIG. 3 to FIG. 5. In one embodiment, the instructions 624 can transform the general, non-programmed machine 600 into a particular machine (e.g., specially configured machine) programmed to carry out the described and illustrated functions in the manner described.

In alternative embodiments, the machine 600 operates as a standalone device or may be connected (e.g., networked) to other machines. In a networked deployment, the machine 600 may operate in the capacity of a server machine or a client machine in a server-client network environment, or as a peer machine in a peer-to-peer (or distributed) network environment. The machine 600 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 624 (sequentially or otherwise) that specify actions to be taken by that machine. Further, while only a single machine is illustrated, the term "machine" shall also be taken to include a collection of machines that individually or jointly execute the instructions 624 to perform any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The processor 602 may contain microcircuits that are configurable, temporarily or permanently, by some or all of the instructions 624 such that the processor 602 is configurable to perform any one or more of the methodologies described herein, in whole or in part. For example, a set of one or more microcircuits of the processor 602 may be configurable to execute one or more modules (e.g., software modules) described herein.

The machine 600 may further include a graphics display 610 (e.g., a plasma display panel (PDP), a light emitting diode (LED) display, a liquid crystal display (LCD), a projector, or a cathode ray tube (CRT), or any other display capable of displaying graphics or video). The machine 600 may also include an input device 612 (e.g., a keyboard), a cursor control device 614 (e.g., a mouse, a touchpad, a trackball, a joystick, a motion sensor, or other pointing instrument), a storage unit 616, a signal generation device 618 (e.g., a sound card, an amplifier, a speaker, a headphone jack, or any suitable combination thereof), and a network interface device 620.

The storage unit 616 includes a machine-storage medium 622 (e.g., a tangible machine-storage medium) on which is stored the instructions 624 (e.g., software) embodying any one or more of the methodologies or functions described herein. The instructions 624 may also reside, completely or at least partially, within the main memory 604, within the processor 602 (e.g., within the processor's cache memory), or both, before or during execution thereof by the machine 600. Accordingly, the main memory 604 and the processor 602 may be considered as machine-storage media (e.g., tangible and non-transitory machine-storage media). The instructions 624 may be transmitted or received over a network 626 via the network interface device 620.

In some example embodiments, the machine 600 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (e.g., 604, 606, and/or memory of the processor(s) 602) and/or storage unit 616 may store one or more sets of instructions and data structures (e.g., software) 624 embodying or utilized by any one or more of the methodologies or functions described herein. These instructions, when executed by processor(s) 602 cause various operations to implement the disclosed embodiments.

As used herein, the terms "machine-storage medium," "device-storage medium," "computer-storage medium" (referred to collectively as "machine-storage medium 622") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 622 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage medium or media, computer-storage medium or media, and device-storage medium or media 622 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 624 may further be transmitted or received over a communications network 626 using a transmission medium via the network interface device 620 and utilizing any one of a number of well-known transfer protocols (e.g., HTTP). Examples of communication networks 626 include a local area network (LAN), a wide area network (WAN), the Internet, mobile telephone networks, plain old telephone service (POTS) networks, and wireless data networks (e.g., Wi-Fi, LTE, and WiMAX networks). The term "transmission medium" shall be taken to include any intangible medium that is capable of storing, encoding, or carrying instructions 624 for execution by the machine 600, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

In view of the disclosure above, various examples are set forth below. It should be noted that one or more features of an example, taken in isolation or combination, should be considered within the disclosure of this application

EXAMPLES

Example 1 is a method for providing secure hybrid data transfer through connection and request direction decoupling. The method comprises receiving, by a source server at a source, a request to initiate a reverse connection to a destination server at a destination; in response to receiving the request, establishing, by the source server, a connection to the destination server, the connection being used to transfer data from the source to the destination; and reversing the connection, the reversing enabling a client in the destination to send requests to the source server for the data.

In example 2, the subject matter of example 1 can optionally include wherein the source server comprises a source broker in a source cluster, the source being on-premises.

In example 3, the subject matter of any of examples 1-2 can optionally include wherein the destination server comprises a destination broker in a destination cluster, the destination being in the cloud.

In example 4, the subject matter of any of examples 1-3 can optionally include wherein the reversing the connection comprises causing the destination server to remove the connection from a network server at the destination and to add the connection to a network client at the destination; and removing, by the source server, the connection from a network client at the source and adding the connection to a network server in the source.

In example 5, the subject matter of any of examples 1~4 can optionally include establishing, by a source controller at the source, a persistent reverse connection to a destination controller at the destination on which a destination client can request a connection from any source broker to any destination broker.

In example 6, the subject matter of any of examples 1-5 can optionally include establishing a source service identity associated with the request based on connection or request credentials being authenticated by the source server using security mechanisms supported in the source cluster; and authorizing, by the source server, the request to initiate the reverse connection based on the source service identity associated with the request.

In example 7, the subject matter of any of examples 1-6 can optionally include authenticating the source broker to the destination broker using credentials of security mechanisms supported in the destination cluster, wherein the request to reverse the connection is authorized by the destination server based on an authenticated destination service identity associated with the connection or request from the source server.

In example 8, the subject matter of any of examples 1-7 can optionally include, after reversing the connection, associating, by the source server, the source service identity to a server-side of the reverse connection, wherein further requests from the destination are securely authorized using the source service identity.

In example 9, the subject matter of any of examples 1-8 can optionally include, after reversing the connection, receiving, by the source server, a request for data from the client in the destination; and in response to receiving the request for data, transmitting the data from a topic at the source to a topic at the destination.

Example 10 is a system for providing secure hybrid data transfer through connection and request direction decoupling. The system comprises one or more hardware processors and a memory storing instructions that, when executed by the one or more hardware processors, cause the one or more hardware processors to perform operations comprising receiving, by a source server at a source, a request to initiate a reverse connection to a destination server at a destination; in response to receiving the request, establishing, by the source server, a connection to the destination server, the connection being used to transfer data from the source to the destination; and reversing the connection, the reversing enabling a client at the destination to send requests to the source server for the data.

In example 11, the subject matter of example 10 can optionally include wherein the source server comprises a source broker in a source cluster, the source being on-premises.

In example 12, the subject matter of any of examples 10-11 can optionally include wherein the destination server comprises a destination broker in a destination cluster, the destination being in the cloud.

In example 13, the subject matter of any of examples 10-12 can optionally include wherein the reversing the connection comprises causing the destination server to remove the connection from a network server at the destination and to add the connection to a network client at the destination; and removing, by the source server, the connection from a network client at the source and adding the connection to a network server in the source.

In example 14, the subject matter of any of examples 10-13 can optionally include wherein the operations further comprise after reversing the connection, receiving, by the source server, a request for data from the client in the destination; and in response to receiving the request for data, transmitting the data from a topic at the source to a topic at the destination.

Example 15 is a storage medium comprising instructions which, when executed by one or more hardware processors of a machine, cause the machine to perform operations for providing secure hybrid data transfer through connection and request direction decoupling. The operations comprise receiving, by a source server at a source, a request to initiate a reverse connection to a destination server at a destination; in response to receiving the request, establishing, by the source server, a connection to the destination server, the connection being used to transfer data from the source to the destination; and reversing the connection, the reversing enabling a client in the destination to send requests to the source server for the data.

In example 16, the subject matter of example 15 can optionally include wherein the source server comprises a source broker in a source cluster, the source being on-premises.

In example 17, the subject matter of any of examples 16 can optionally include wherein the destination server comprises a destination broker in a destination cluster, the destination being in the cloud.

In example 18, the subject matter of any of examples 15-17 can optionally include wherein the reversing the connection comprises causing the destination server to remove the connection from a network server at the destination and to add the connection to a network client at the destination; and removing, by the server, the connection from a network client at the source and adding the connection to a network server in the source.

In example 19, the subject matter of any of examples 15-18 can optionally include wherein the operations further comprise establishing, by a source controller at the source, a persistent reverse connection to a destination controller at the destination on which a destination client can request a connection from any source broker to any destination broker.

In example 20, the subject matter of any of examples 15-19 can optionally include wherein the operations further comprise, after reversing the connection, receiving, by the source server, a request for data from the client in the destination; and in response to receiving the request for data, transmitting the data from a topic at the source to a topic at the destination.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:

receiving, from a source controller by a source server at a source of a distributed streaming platform, a request to initiate a reverse connection to a destination server at a destination of the distributed streaming platform;

in response to receiving the request, establishing, by the source server, a connection to the destination server, the connection being used to transfer data from the source to the destination; and reversing the connection, the reversing comprising:

transmitting, by the source server, a reverse connection request to the destination server after establishing the connection;

responsive to the reverse connection request, causing the destination server to remove the connection from a network server at the destination that accepts connections on one or more listeners and allocates each connection to a processor from its pool of processors, with a state of each connection stored in a channel managed by a selector associated with an assigned processor of the network server and to add the connection to a network client at the destination that establishes connections and processes traffic to and from brokers, with a state of each connection stored in a channel managed by a selector of the network client;

receiving, by the source server, a response to the reverse connection request from the destination server; and responsive to receiving the response to the reverse connection request, removing, by the source server, the connection from a network client at the source that establishes connections and processes traffic to and from brokers, with a state of each connection stored in a channel managed by a selector of the network client at the source and adding the connection to a network server at the source that accepts connections on one or more listeners and allocates each connection to a processor from its pool of processors, with a state of each connection stored in a channel managed by a selector associated with an assigned processor of the network server at the source, the reversing enabling a client in the destination to send requests to the source server for the data on the reversed connection.

2. The method of claim 1, wherein:

the source server comprises a source broker in a source cluster on-premises;

the destination server comprises a destination broker in a destination cluster in a cloud; and the establishing the connection and triggering the reversing is performed by the source broker.

3. The method of claim 2, further comprising:

authenticating the source broker to the destination broker using credentials of security mechanisms supported in the destination cluster, wherein the reverse connection request to reverse the established connection is authorized by the destination server based on an authenticated destination service identity associated with the connection or the reverse connection request from the source server.

4. The method of claim 1, further comprising:

after establishing the connection and before reversing the connection, negotiating an application programming interface (API) version to be used in subsequent requests.

5. The method of claim 1, wherein:

the causing the destination server to remove the connection from the network server at the destination and to add the connection to the network client at the destination comprises causing the destination server to remove a server-side channel on which the reverse connection request was received from the network server at the destination and to add a client-side channel to the network client at the destination; and the removing the connection from the network client at the source and adding the connection to the network server at the source comprises removing a client-side channel that was used to send the reverse connection request from a network client at the source and adding a server-side channel to a network server at the source.

6. The method of claim 1, further comprising:

establishing, by the source controller at the source, a persistent reverse connection to a destination controller at the destination on which a destination client can request a connection from any source broker to any destination broker.

7. The method of claim 1, further comprising:

establishing a source service identity associated with the request based on connection or request credentials being authenticated by the source server using security mechanisms supported in a source cluster; and authorizing, by the source server, the request to initiate the reverse connection based on the source service identity associated with the request.

8. The method of claim 7, further comprising:

after reversing the connection, associating, by the source server, the source service identity to a server-side of the reversed connection, wherein further requests from the destination are securely authorized using the source service identity.

9. The method of claim 1, further comprising:

after reversing the connection, receiving, by the source server, a request for data from the client at the destination; and in response to receiving the request for data, transmitting the data from a topic at the source to a topic at the destination.

10. A system comprising:

one or more hardware processors; and a memory storing instructions that, when executed by the one or more hardware processors, cause the one or more hardware processors to perform operations comprising:

receiving, from a source controller by a source server at a source of a distributed streaming platform, a request to initiate a reverse connection to a destination server at a destination of the distributed streaming platform;

in response to receiving the request, establishing, by the source server, a connection to the destination server, the connection being used to transfer data from the source to the destination; and reversing the connection, the reversing comprising:

transmitting, by the source server, a reverse connection request to the destination server after establishing the connection:

responsive to the reverse connection request, causing the destination server to remove the connection from a network server at the destination that accepts connections on one or more listeners and allocates each connection to a processor from its pool of processors, with a state of each connection stored in a channel managed by a selector associated with an assigned processor of the network server and to add the connection to a network client at the destination that establishes connections and processes traffic to and from brokers, with a state of each connection stored in a channel managed by a selector of the network client;

receiving, by the source server, a response to the reverse connection request from the destination server; and responsive to receiving the response to the reverse connection request, removing, by the source server, the connection from a network client at the source that establishes connections and processes traffic to and from brokers, with a state of each connection stored in a channel managed by a selector of the network client at the source and adding the connection to a network server at the source that accepts connections on one or more listeners and allocates each connection to a processor from its pool of processors, with a state of each connection stored in a channel managed by a selector associated with an assigned processor of the network server at the source, the reversing enabling a client in the destination to send requests to the source server for the data on the reversed connection.

11. The system of claim 10, wherein:

the source server comprises a source broker in a source cluster on-premises;

the destination server comprises a destination broker in a destination cluster in a cloud; and the establishing the connection and triggering the reversing is performed by the source broker.

12. The system of claim 10, wherein the operations further comprise:

after establishing the connection and before reversing the connection, negotiating an application programming interface (API) version to be used in subsequent requests.

13. The system of claim 10, wherein:

the causing the destination server to remove the connection from the network server at the destination and to add the connection to the network client at the destination in response to receiving the reverse connection request comprises causing the destination server to remove a server-side channel on which the reverse connection request was received from the network server at the destination and to add a client-side channel to the network client at the destination; and the removing the connection from the network client at the source and adding the connection to the network server in the source comprises removing a client-side channel that was used to send the reverse connection request from a network client at the source and adding a server-side channel to a network server at the source.

14. The system of claim 10, wherein the operations further comprise:

after reversing the connection, receiving, by the source server, a request for data from the client at the destination; and in response to receiving the request for data, transmitting the data from a topic at the source to a topic at the destination.

15. A machine-storage medium comprising instructions which, when executed by one or more hardware processors of a machine, cause the machine to perform operations comprising:

receiving, from a source controller by a source server at a source of a distributed streaming platform, a request to initiate a reverse connection to a destination server at a destination of the distributed streaming platform;

in response to receiving the request, establishing, by the source server, a connection to the destination server, the connection being used to transfer data from the source to the destination; and reversing the connection, the reversing comprising:

transmitting, by the source server, a reverse connection request to the destination server after establishing the connection;

responsive to the reverse connection request, causing the destination server to remove the connection from a network server at the destination that accepts connections on one or more listeners and allocates each connection to a processor from its pool of processors, with a state of each connection stored in a channel managed by a selector associated with an assigned processor of the network server and to add the connection to a network client at the destination that establishes connections and processes traffic to and from brokers, with a state of each connection stored in a channel managed by a selector of the network client;

receiving, by the source server, the response to the reverse connection request from the destination server; and responsive to receiving the response to the reverse connection request, removing, by the source server, the connection from a network client at the source that establishes connections and processes traffic to and from brokers, with a state of each connection stored in a channel managed by a selector of the network client at the source and adding the connection to a network server at the source that accepts connections on one or more listeners and allocates each connection to a processor from its pool of processors, with a state of each connection stored in a channel managed by a selector associated with an assigned processor of the network server at the source, the reversing enabling a client in the destination to send requests to the source server for the data on the reversed connection.

16. The machine-storage medium of claim 15, wherein:

the source server comprises a source broker in a source cluster on-premises;

the destination server comprises a destination broker in a destination cluster in the cloud; and the establishing the connection and triggering the reversing is performed by the source broker.

17. The machine-storage medium of claim 15, wherein the operations further comprise:

after establishing the connection and before reversing the connection, negotiating an application programming interface (API) version to be used in subsequent requests.

18. The machine-storage medium of claim 15, wherein:

the causing the destination server to remove the connection from the network server at the destination and to add the connection to the network client at the destination comprises causing the destination server to remove a server-side channel on which the reverse connection request was received from the network server at the destination and to add a client-side channel to the network client at the destination; and the removing the connection from the network client at the source and adding the connection to the network server at the source comprises removing a client-side channel that was used to send the reverse connection request from a network client at the source and adding a server-side channel to a network server at the source.

19. The machine-storage medium of claim 15, wherein the operations further comprise:

establishing, by the source controller at the source, a persistent reverse connection to a destination controller at the destination on which a destination client can request a connection from any source broker to any destination broker.

20. The machine-storage medium of claim 15, wherein the operations further comprise:

after reversing the connection, receiving, by the source server, a request for data from the client at the destination; and in response to receiving the request for data, transmitting the data from a topic at the source to a topic at the destination.

* * * * *